R. B. COCHRANE.
PACKAGE WRAPPING MACHINE.
APPLICATION FILED AUG. 2, 1909.

996,213.

Patented June 27, 1911.
8 SHEETS—SHEET 1.

FIG.1.

WITNESSES:

INVENTOR:

R. B. COCHRANE.
PACKAGE WRAPPING MACHINE.
APPLICATION FILED AUG. 2, 1909.

996,213.

Patented June 27, 1911.

WITNESSES:

INVENTOR:

R. B. COCHRANE.
PACKAGE WRAPPING MACHINE.
APPLICATION FILED AUG. 2, 1909.

996,213.

Patented June 27, 1911.
8 SHEETS—SHEET 4.

WITNESSES:
Clarence W. Carroll
D. Gurnee.

INVENTOR:
Robert B. Cochrane
by Osgood & Davis
his attorneys

R. B. COCHRANE.
PACKAGE WRAPPING MACHINE.
APPLICATION FILED AUG. 2, 1909.

996,213.

Patented June 27, 1911.

WITNESSES:
Clarence W. Carroll
W. Gurnee

INVENTOR:
Robert B. Cochrane
by Osgood & Davis
his attorneys

R. B. COCHRANE.
PACKAGE WRAPPING MACHINE.
APPLICATION FILED AUG. 2, 1909.

996,213.

Patented June 27, 1911.
8 SHEETS—SHEET 6.

WITNESSES:
Clarence W. Carroll
D. Gurnee

INVENTOR:
Robert B. Cochrane
by Osgood & Davis
his attorneys

R. B. COCHRANE.
PACKAGE WRAPPING MACHINE.
APPLICATION FILED AUG. 2, 1909.

996,213.

Patented June 27, 1911.

WITNESSES:
Clarence W. Carroll
L. Gurnee.

INVENTOR:
Robert B. Cochrane
by Osgood & Davis
his attorneys

UNITED STATES PATENT OFFICE.

ROBERT B. COCHRANE, OF ROCHESTER, NEW YORK, ASSIGNOR TO ARTHUR H. INGLE, OF ROCHESTER, NEW YORK.

PACKAGE-WRAPPING MACHINE.

996,213.  Specification of Letters Patent.  Patented June 27, 1911.

Application filed August 2, 1909. Serial No. 510,894.

*To all whom it may concern:*

Be it known that I, ROBERT B. COCHRANE, a citizen of the United States, and resident of Rochester, in the county of Monroe and State of New York, have invented certain new and useful Improvements in Package-Wrapping Machines, of which the following is a specification.

This invention relates to package-wrapping machines, and has for its object to produce a machine of comparatively few parts, that is efficient and easily operated.

The machine illustrated in the drawings has upright side-frames 1—1, connected by cross braces 2, 2. A table 3 at the upper end of the frames 1, 1, constitutes a support for the free end of the wrapping paper as it is fed to the machine. All the wrapping operations are performed while the package is in the upper end of a centrally located chute 4, in which position it is supported by a pile of packages X, X, etc., (Fig. 5) that have previously been wrapped. When the machine is first started it is necessary to build up this pile before hand to the proper height. The drawings show a machine adapted for hand operation, by means of a crank wheel 5. A pinion 6 on said wheel meshes with a gear 7 on a transverse shaft 8, and the folding mechanisms are operated through suitable connections with this same shaft, the parts being so proportioned that one revolution of the shaft 8, which necessitates two revolutions of the wheel 5, completely wraps a package. The articles to be wrapped are shown as loaves of bread Y.

Figure 1:
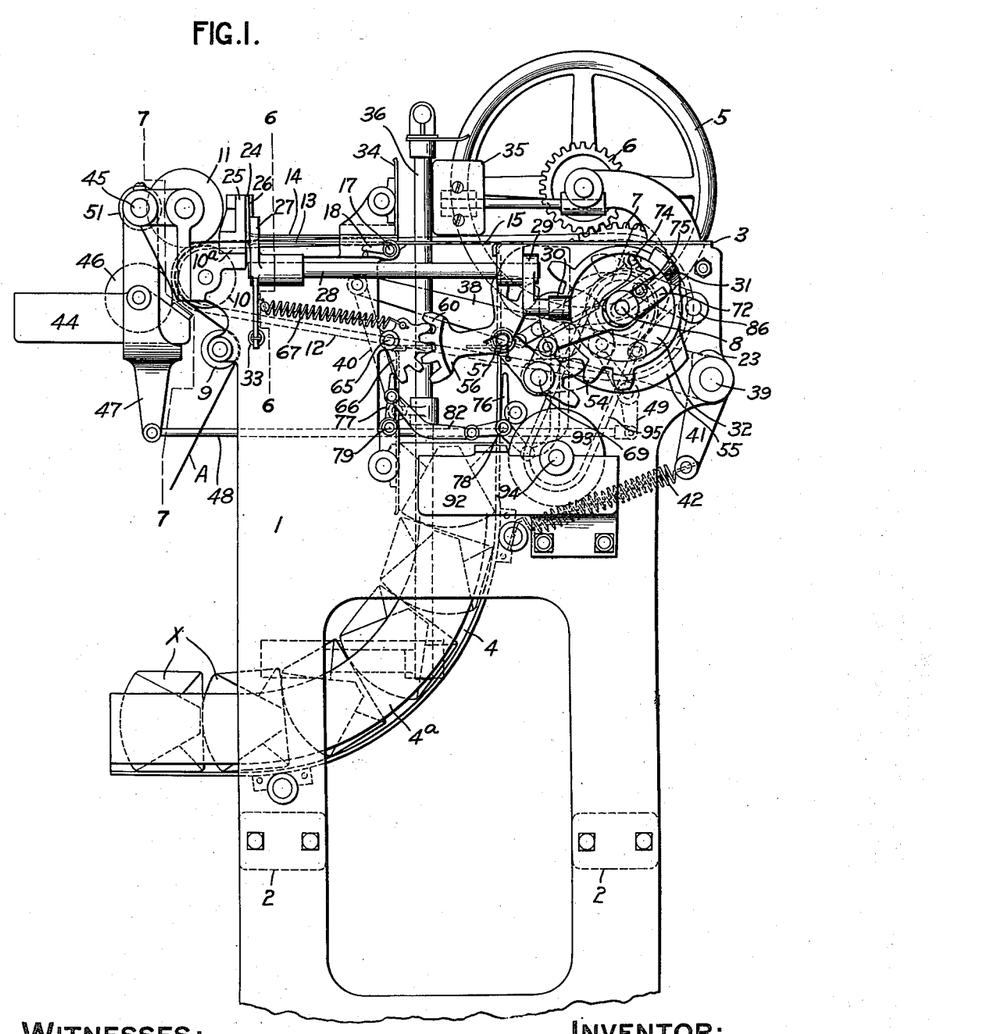
—Figure 1 is an elevation of the left side of a machine embodying the present invention.
Figure 3:
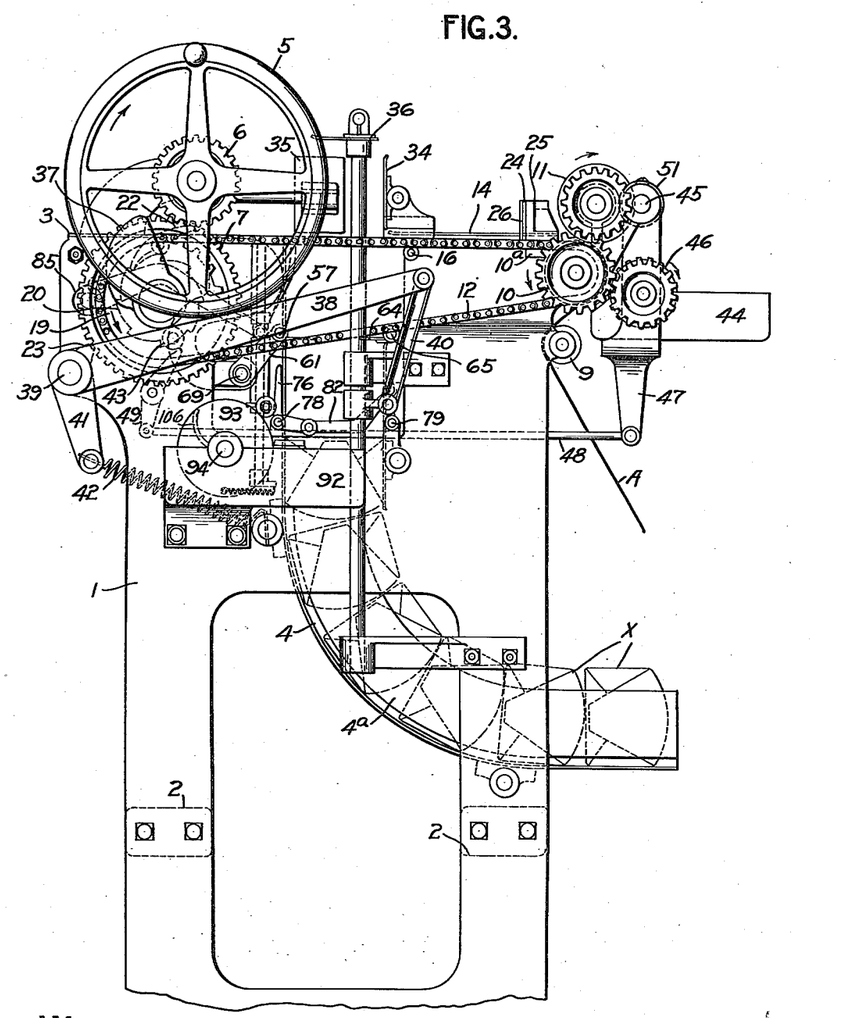
Fig. 3 is an elevation of the right side.
Figure 4:
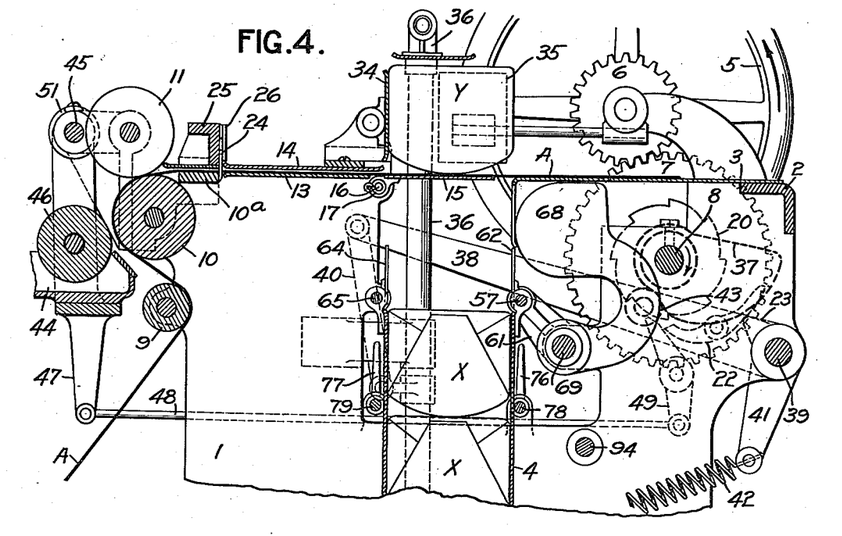
Fig. 4 is a section on the line 4—4 of Fig. 2, the parts being shown in their normal positions.
Figure 5:
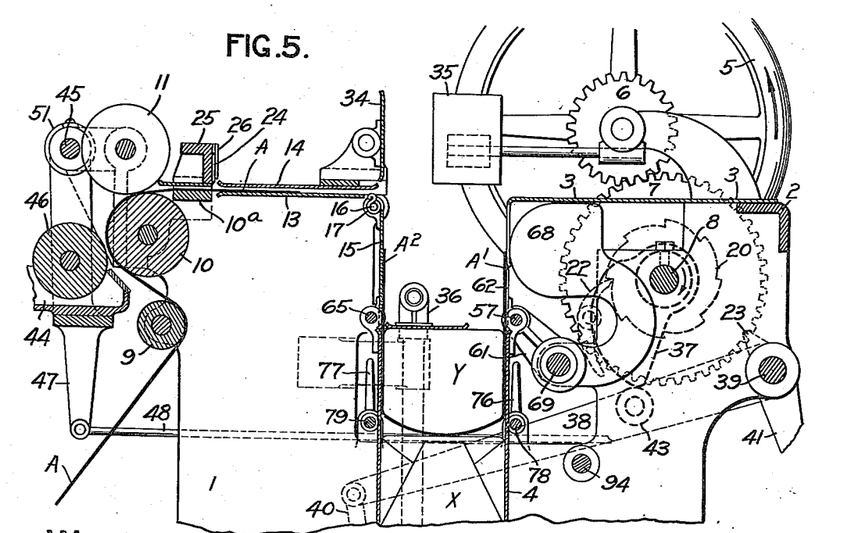
Fig. 5 is a similar view, the parts being in their extreme operating positions.
Figure 15:
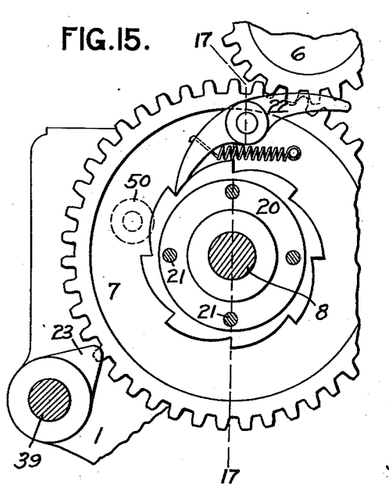
Figs. 15 and 16 are views of regulating mechanism for the paper feed, taken from the right side of the machine.
Figure 16:
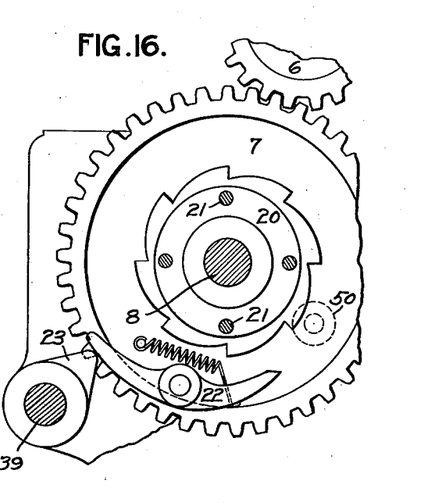

The wrapping-paper A is fed into the machine in a strip, that passes under a guide roll 9, and between feed-rolls 10 and 11. The roll 10 is driven from the shaft 8 by a chain 12, (Fig. 3), and the roll 11 is geared to and rotated by the roll 10. The feed-rolls are not operated continuously but stop automatically for an interval at every revolution of the shaft 8, to permit a cutter to shear off a piece of the paper at the proper length for wrapping a loaf. The paper is pushed by the rolls 10 and 11 in the manner described over a stationary shear-blade $10^a$, and thence, between guide-plates 13 and 14 (Figs. 4 and 5) onto the table 3 and over the top of the chute 4, while fingers 15 that are pivoted on a shaft 16 support it. These fingers are normally held horizontal by the torsion of a spring 17, and are prevented by a stop 18 (Fig. 1) from rising above the plane of the table 3. The feed rolls are operated by the chain 12 (Fig. 3) from a sprocket 19 on the shaft 8. When the proper length of paper has been fed across the table 3, the feed rolls are stopped by means of intermediate mechanism shown in Figs. 15, 16 and 17. The sprocket 19 is fixed to a ratchet 20, by screws 21 (Fig. 17), while both the sprocket and ratchet are loose upon the driven shaft 8. The gear 7 above mentioned, which is fixed on said shaft, carries a spring-pressed pawl 22 that normally engages the ratchet 20, so that said ratchet 20 and the sprocket 19 rotate with the gear 7. At the moment when the paper A has been extended across the chute 4, the pawl 22 disengages the ratchet 20, and the latter promptly stops, and with it the paper feed rolls 10 and 11. This pawl 22 is caused to disengage the ratchet 20 by an abutment 23 (Fig. 16) which comes into contact with it. The feeding of the paper is suspended while the pawl passes to the next tooth of the ratchet 20. While the pawl passes from one tooth of the ratchet to the next, a movable shear-blade 24 (Fig. 6) is brought into operation to cut off a length of the paper A against the stationary blade 10ª. The blade 24 is supported on a bridge 25 (Figs. 8 and 9) by parallel links 26, and is operated by an arm 27 on a rock-shaft 28, the latter in turn being rotated by another arm 29 at its front end (Fig. 1) which has a roller 30 that engages a lug 31 on the face of a disk 32 that is carried on the operating shaft 8. In this way the rod 28 is rotated to swing the arm 27 toward the right, whereupon the links 26, because of their obliquity, carry the blade 24 downward so that it shears off the paper. As soon as the lug 31 passes the roller 30, the blade 24 is returned by the action of a spring 33 that engages the lower end of the arm 27. At this point in the operation of the machine, the operator places a loaf of bread Y upon the paper and directly over the fingers 15 (Fig. 4), at the same time pressing it against both back and side gage-plates or stops 34 and 35, thereby establishing it in proper position with respect to the wrapper. Further rotation of the wheel 5 brings the folding mechanisms into operation. In the first place the loaf Y is forced downward into the chute 4 by a plunger 36, whose stroke is just long enough to carry the loaf to the position shown in Fig. 5, where it rests upon the top of the loaf last wrapped. The plunger 36 is depressed by the action of a cam 37 (Figs. 1 and 4) that is carried on the driven shaft 8 and engages a cam roller 43 on a lever 38 that is pivoted at 39 on the right side of the machine, and is connected with the plunger 36 by a link 40. This lever has a depending arm 41, to which a spring 42 is attached, and this spring tends normally to swing the lever 38 upward, and so hold the bearing-roller 43 against the periphery of the cam 37. After the plunger 36 has pushed the loaf Y, together with the wrapper, into the chute 4, as shown in Fig. 5, and the cam 37 has passed the roller 43, the spring 42 quickly raises said plunger to its normal position. The fingers 15 are turned down by the loaf of bread when it is depressed, and are returned to the horizontal position, when the plunger rises, by the spring 17. The rotation of the paper-feed rolls 10 and 11 is resumed while the plunger is at the lower limit of its stroke, but it rises so rapidly under the tension of the spring 42 that it passes above the level of the table 3 before the end of the paper reaches the chute 4.

Figure 2:
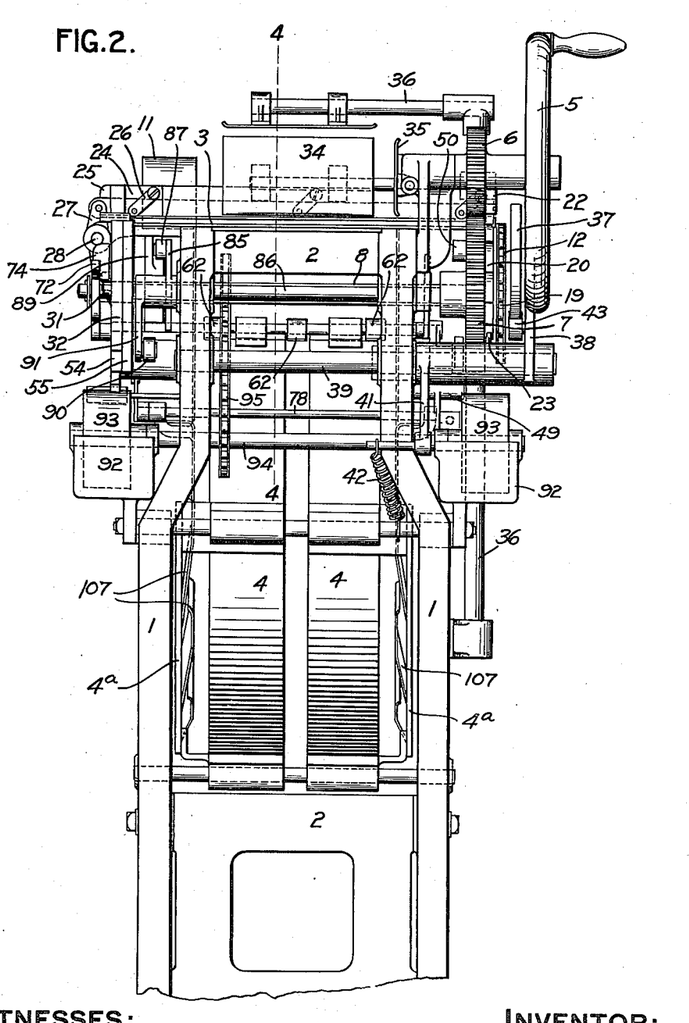
Fig. 2 is a front view.
Figure 6:
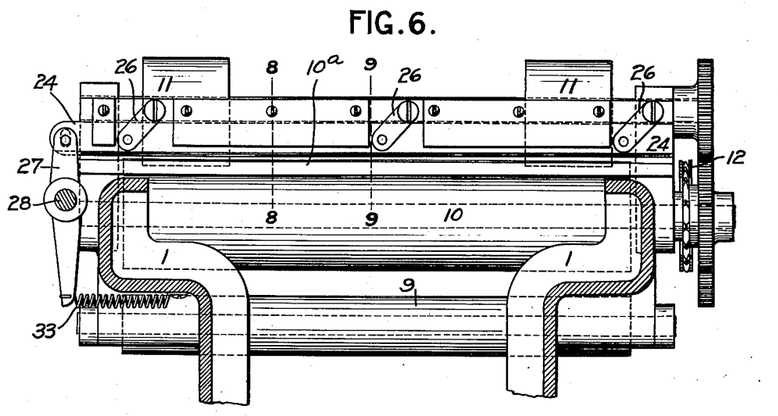
Figs. 6 and 7 are sections on the lines 6—6 and 7—7, respectively, of Fig. 1.
Figures 7, 8, 9:
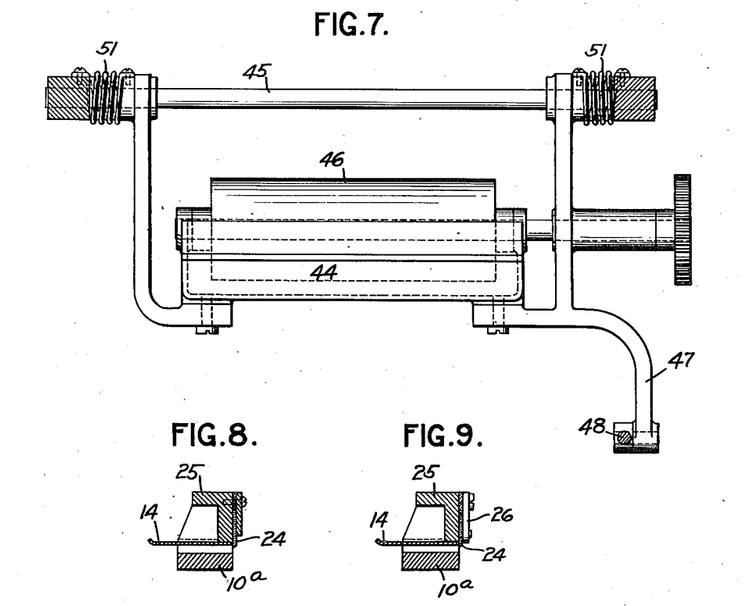
Figs. 8 and 9 are sections on the lines 8—8 and 9—9, respectively, of Fig. 6.

A suitable device is provided for applying glue to the wrapper at one of its transverse edges, in order that when the latter are turned down upon the loaf, they will adhere. In the present instance the glue is applied before the paper passes between the feed rolls, the upper feed roll 11 being divided so that it is not touched by the part of the paper upon which the glue has been deposited (Fig. 6). The glue for this first gluing operation is carried in a pot 44, that is pivotally suspended on a stationary rod 45 (Fig. 7). A roll 46 in the pot is geared to the rolls 10 and 11, and accordingly is revolved intermittently so as to cover its face with fresh glue. An arm 47 depending from the pot is connected through a rod 48 with a lever 49 (Fig. 4), the upper end of which is struck at every revolution of the gear 7 by a lug 50 (Fig. 2) upon it. This draws the rod 48 and arm 47 forward, thereby pulling the glue-roll 46 against the paper A and holding it there as the paper passes over the roll 10. As soon as the lug 50 slips past the lever 49, the glue pot 44 is swung away from the paper by the action of springs 51 that are coiled around the pivot 45. The glue roll is adapted to deposit a line of glue across the paper that is approximately equal to the width of the loaf Y.

Figure 10:
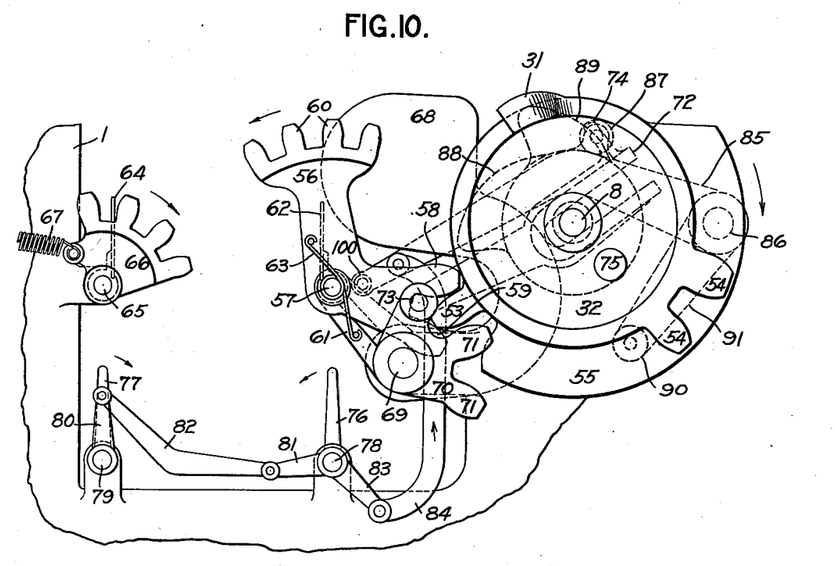
Fig. 10 is an elevation of the side-folding mechanism, enlarged from Fig. 1, the parts being in normal position.
Figure 11:
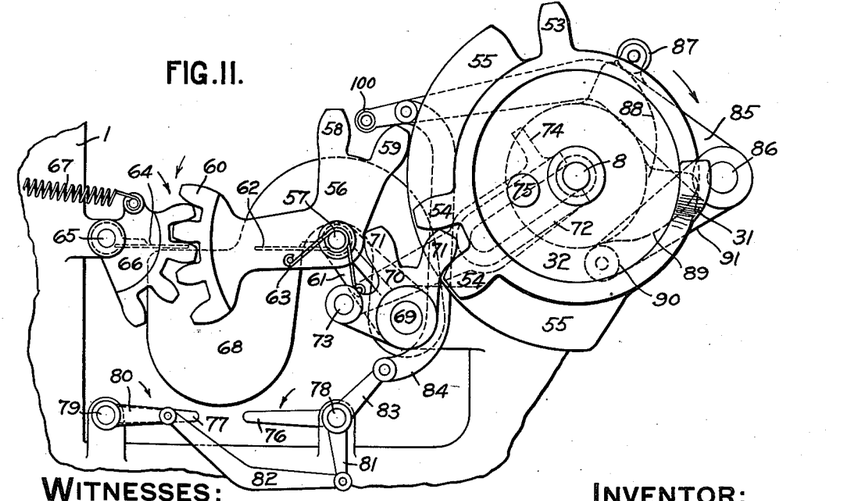
Fig. 11 is a similar view showing the parts in their extreme operating position.
Figures 17, 18, 19, 20, 21:
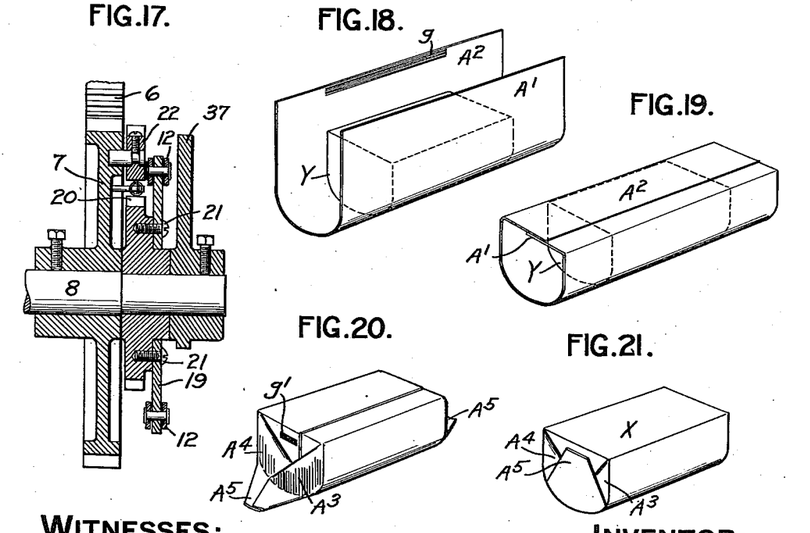
Fig. 17 is a section on the line 17—17 of Fig. 15.
Figs. 18, 19, 20 and 21 show the package in the various wrapping stages.

The loaf and wrapper when carried into the chute as described, appear as shown in Fig. 18, in which case the sides A', A² of the wrapper project upward above the loaf—one side A² having the line of glue $g$ on its inner side. The first folding operation carries the side A' down upon the loaf, and the side A² is then folded upon the top of the side A', the glue $g$ coming against the latter. This leaves the package as shown in Fig. 19. The first folding operation is performed by the mechanism shown in Figs. 10 and 11. On the left end of the driven shaft 8 is a disk 32, having gear teeth 53 and 54 that are in different planes on its periphery, while a flange 55 lies in the same plane with the tooth 53 (Fig. 2) and extends approximately half-way around the periphery of the disk. A bell-crank lever 56 also lies in the plane of the tooth 53, and is revolubly supported by a shaft 57 to which it is attached. Said lever has adjacent teeth 58, 59 at its front end, that are adapted to receive between them the tooth 53, and at its upper end has teeth 60. The shaft 57 is revoluble in brackets 61. The purpose of this mechanism is to operate a series of blades 62 (Fig. 2) that are attached to said shaft 57 and are employed to turn down the side A' of the wrapper upon the loaf Y when the shaft is rotated in the direction indicated in Fig. 10. This movement occurs at each revolution of the shaft 8, when the tooth 53 strikes the tooth 58, and the blades 62 are turned through 90 degrees (Fig. 11), and are kept in that position by the flange 55, which comes into contact with the tooth 59, until subsequent folding operations are completed. When said flange passes off the tooth 59, a spring 63 returns the lever 56 to its original position. The other side A² of the wrapper is turned down upon the side A' by similar blades 64 (Figs. 3 and 11) that are fixed to a shaft 65. The latter carries a segmental pinion 66 that is engaged by the teeth 60 as the lever swings downward (Figs. 10 and 11). Said lever moves through nearly half its travel before engaging the segment 66, but inasmuch as said segment has a shorter radius than the lever, it turns more rapidly and brings the blades 64 to the horizontal position simultaneously with the blades 62, the fingers 15 having previously moved up to their horizontal position, though the side A' is turned down first, so that the side A² overlies it. The segment 66 and the blades 64 are returned by a spring 67 to their initial positions, and in their initial positions both the blades 62 and the blades 64 are in line with the front and back of the chute (Fig. 4) where they are out of the path of the loaf. Shortly after the sides of the wrapper have been folded down upon the loaf, as described, the wrapper is turned downward at the top, on each side, against the ends of the loaf, and at the same time, the front and rear lower corners of the projecting portions are turned inwardly. The top of the wrapper at the ends of the loaf is turned down at each end of the loaf, by curved blades 68, fixed on a shaft 69 that is pivoted in brackets 61 (Figs. 10 and 11). On the end of the shaft 69 is a toothed segment 70 whose teeth 71, 71 are adapted to be engaged by teeth 54 before mentioned, on the disk 32. As the latter revolves, the segment 70 is turned through 90 degrees (Fig. 11), thereby causing the blades 68 to pass close to the ends of the loaf Y, so that they turn the wrapper downward from the top. In order to return the segment 70 to the position shown in Fig. 10 a slotted link 72 is employed. This link (shown by dotted lines in Figs. 10 and 11) is pivoted to the segment at 73, and spans the shaft 8. A lug 74 on the link (Fig. 2) is struck by a pin 75 that projects from the side of the disk 53, the pin disengaging the lug when the link has been fully returned to its normal position. Next, the corners A³ and A⁴ are turned in against the ends of the loaf by fingers 76 and 77, that are, respectively, fixed on transverse rock shafts 78 and 79 (Figs. 10 and 11). The shaft 79 carries an upwardly extending arm 80, and the shaft 78 a downwardly extending arm 81. These arms are connected by a rod 82, and accordingly a movement of the arm 81 causes both the shafts 78 and 79 to rotate in opposite directions, as indicated in Fig. 10. The shaft 78 also carries an arm 83, which is connected by a rod 84 with a lever 85 that is fixed on a rock shaft 86. Said lever carries a roller 87 that bears against a cam 88 on the shaft 8, so that it is raised by the cam at each revolution of the shaft 8. Thus the cam 88 operates the shafts 78 and 79 as indicated in Fig. 11, so that the fingers 76 and 77 swing toward each other. As the fingers turn downwardly they carry the corner folds A³, A⁴ of the wrapper inwardly, and the folds lie against the portions that have previously been turned downward by the blades 68. The package then has the appearance of Fig. 20. Immediately after the lever 85 has been carried to its upper limit by the cam 88, it is forced downward again by another cam 89, also on the shaft 8. The latter strikes a roller 90 on the end of an arm 91 that is fixed to the shaft 86, and pushes it to the position shown in Fig. 10, thus bringing the fingers 76 and 77 again to the vertical position.

Figures 12, 13, 14:
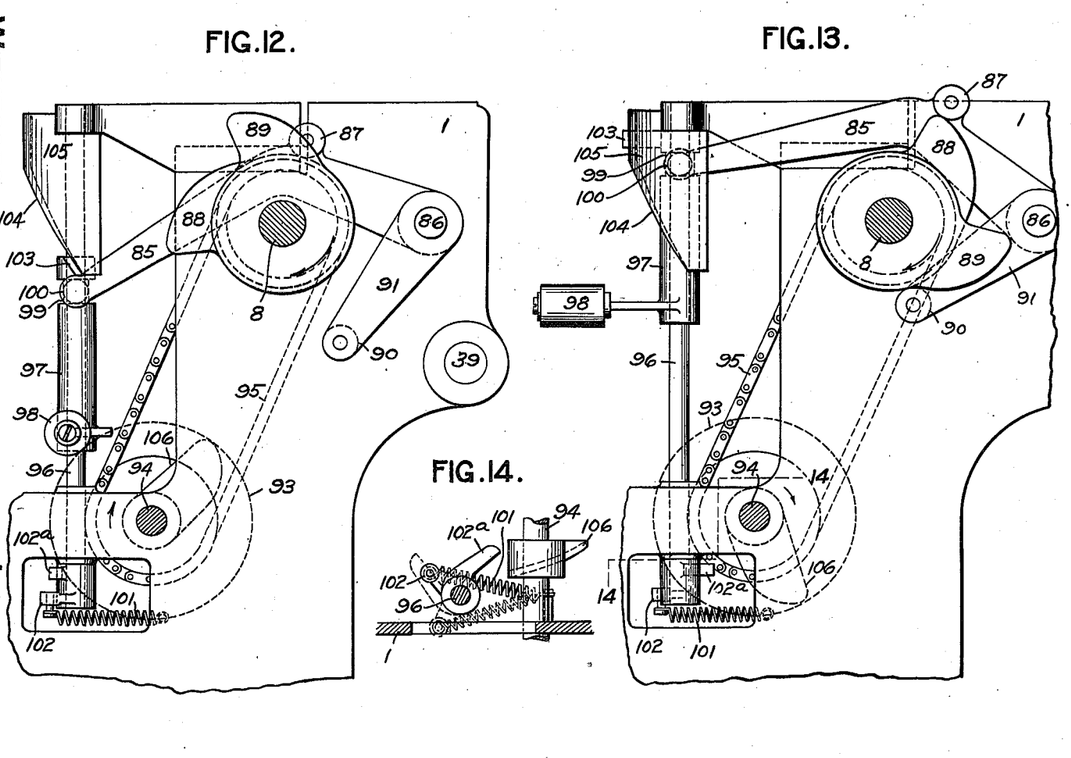
Fig. 12 is an elevation of the side-gluing mechanism, in normal position.
Fig. 13 is a similar view showing the parts in operating positions.
Fig. 14 is a plan view taken on the line 14—14 of Fig. 13.

The only operation now necessary to complete the package is the turning up of the projecting bottom portions A⁵ of the wrapper against the ends already folded in. Before this is done, however, glue is applied to each end of the wrapper at g' (Fig. 20), so that the ends A⁵ will stick when turned up. The mechanism for applying this glue is shown in Figs. 12, 13 and 14. The glue is carried in a pot 92 (Figs. 1, 2 and 3) which also contains a roll 93. This roll is carried on a shaft 94 which is rotated by a chain 95 that runs over a sprocket on the shaft 8, so that a fresh supply of glue is always on the surface of the roll 93. Just behind the shaft 94 is a vertical shaft 96, that rocks in suitable bearings in the frame 1. On this shaft is a sleeve 97, which is slidable upon it, but is connected to turn with it, and projecting from said sleeve is an arm that supports a glue-transferring roll 98. At the upper end of the sleeve 97 is an annular groove 99, within which rests a roller 100 that is attached to the end of the same lever 85 that operates the folding fingers 76 and 77. The sleeve 97 is slid up the shaft 96 by the lever 85, as the latter is operated by the cams 88 and 89 on the shaft 8 as described in connection with the folding fingers 76 and 77 (Figs. 10 and 11). When the lever 85 is in the position shown in Fig. 10, and the folding fingers 76 and 77 stand vertically on each side of the wrapper (Fig. 10), the sleeve 97 is down near the lower end of the shaft 96, and the transferring-roll 98 is held against the surface of the supply-roll 93 (Fig. 12) by the tension of a spring 101, which extends from a suitable point on the frame 1 to the end of an arm 102 on the shaft 96. When the sleeve 97 is carried upward by the lever 85, a lug 103 on the upper end of the sleeve slides along the face 104 of a cam 105 on the frame, the cam-face being helical in form so that it turns the sleeve through 90 degrees during the upward course, thus bringing the roll 98 around till it comes into contact with the end of the loaf of bread (Fig. 13). The spring 101 operates to hold the roll 98 against the package, for when the shaft 96 has been rotated so as to bring the roller 98 against the package the spring lies at the right of the shaft 96. As the lever 85 is moved downward by the cam 89 (Fig. 13), it causes the roll 98 to travel downward along the end of the package, but when the roll has moved a short distance, a cam 106 on the shaft 94 strikes an arm 102$^a$ (Fig. 14) that is fixed to the shaft 96, and so turns the shaft back until the spring 101 is returned to the other side of the shaft 96, where the tension of the spring holds the lug 103 against the helical edge 104, which guides the roll 98 back into contact with the glue roll, 93. A line of glue as represented by $g'$ (Fig. 20) is thus deposited on the side of the package. The folding fingers 76 and 77 and the sleeve 87 are so connected operatively with the lever 85 that the former fold in the paper before the glue roller 98 comes in contact with it. The ends $A^5$ are turned up against the glue $g'$ by spring strips 107 that extend into the chute on both sides (Fig. 2), and when the package is forced down between these springs, as another loaf is pressed down upon it by the plunger 36, the springs tend to hold the loaf between them so that it can serve as a support for the upper loaf while the latter is being operated upon by the folders. The completed package X as delivered from the chute 4 is shown in Fig. 21.

It will be understood that the folding-blades 68 and the fingers 76 and 77 are duplicated on the machine, as are also the gluing devices just described, so that the wrapper is folded at the same time at both ends of the loaf.

For the sake of simplicity in the description of the novel features of the machine, it is shown as hand operative, but obviously it is readily adapted to be driven mechanically and also to receive the articles that are to be wrapped from a mechanical feeding device.

What I claim is:—

1. In a wrapping machine, the combination of a receptacle adapted to hold the article to be wrapped and its wrapper; folders pivotally supported on opposite sides of the receptacle, respectively; a lever attached to the folders for the first folding operation, having adjacent, radially projecting teeth; a drive shaft; a disk rotatably attached to said shaft, having a radially projecting tooth adapted to engage one of the teeth on the lever for operating said folders, and, adjacent thereto, a segmental rim adapted to engage the other tooth of said lever to hold said folders at the end of the stroke; and means for operating the folders for the second folding operation while said rim engages said second tooth on said lever; substantially as shown and described.

2. In a wrapping machine, the combination, with a receptacle adapted to hold the article to be wrapped and its wrapper, of folding devices adapted, respectively, to fold the wrapper down upon the article and then over on the part first folded; and gluing mechanism, comprising a source of glue at one side of the receptacle first mentioned, a vertical shaft, a glue transferring device comprising an arm mounted upon said shaft and vertically and angularly movable thereon, means for raising said arm between said folding operations, and means for swinging the arm as it rises, from said source of glue to the folded end of said package; substantially as shown and described.

3. In a wrapping machine, the combination, of a receptacle adapted to hold the article to be wrapped together with a wrapper folded around three sides of the article and extending beyond the uncovered fourth side; means for folding down the wrapper upon the fourth side of the article; and means for turning down the wrapper at each end of the article, consisting of pivoted, curved plates 68, 68, adjacent the location of the uncovered sides of the article when the latter is in position in the receptacle, a toothed segment rotatably connected with said plates 68, a drive shaft, a disk rotatably attached to said shaft and having radially projecting teeth adapted to engage said segment for operating said plates 68, and means for returning the segment to its initial position; substantially as shown and described.

ROBERT B. COCHRANE.

Witnesses:
D. GURNEE,
L. THON.